United States Patent [19]

Smucker

[11] Patent Number: 4,550,526

[45] Date of Patent: Nov. 5, 1985

[54] IMPLEMENT FOR CONTACT APPLICATION OF LIQUID HERBICIDES TO CROPS

[76] Inventor: Willard Smucker, 23175 Powerline Rd, Harrisburg, Oreg. 97446

[21] Appl. No.: 572,941

[22] Filed: Jan. 23, 1984

[51] Int. Cl.⁴ .............................................. A01G 13/00
[52] U.S. Cl. .......................................... 47/1.5; 47/1.7
[58] Field of Search .................... 47/1.5, 1.7; 604/251, 604/246

[56] References Cited

U.S. PATENT DOCUMENTS

| | | | |
|---|---|---|---|
| 2,158,115 | 5/1939 | Fullilove | 47/1.5 |
| 3,232,006 | 2/1966 | Atherton et al. | 47/1.5 |
| 4,019,278 | 4/1977 | McKirdy | |
| 4,208,835 | 6/1980 | Roll et al. | |
| 4,223,478 | 9/1980 | McHugh | |
| 4,265,048 | 5/1981 | Schepers et al. | 47/1.5 |
| 4,291,491 | 9/1981 | Maddock | 47/1.5 |
| 4,305,224 | 12/1981 | Maddock | |
| 4,357,779 | 11/1982 | Maddock | |
| 4,380,235 | 4/1983 | Danby | 604/251 |
| 4,459,777 | 7/1984 | Moore et al. | 47/1.5 |

Primary Examiner—Robert A. Hafer
Assistant Examiner—Brodley M. Lewis
Attorney, Agent, or Firm—Klarquist, Sparkman, Campbell, Leigh & Whinston

[57] ABSTRACT

An implement for contact application of liquid herbicides comprises an ultra-lightweight frame supporting a wiper bar and mounted on a tall narrow wheels, and sized so that it can be drawn through a field by a motorcycle without trampling the crops. The wiper bar includes a stiff structural support member enclosed in a sponge or synthetic chamois material and a distribution conduit extending along the wiper bar with small outlet orifices for discharging herbicide liquid into the material along an upper side of the wiper bar. Liquid is supplied to the wiper bar through a gravity feed system including a tank, drip valves, and feed lines arranged to provide a head of liquid above the wiper bar to keep the distribution conduit constantly filled with liquid along its entire length even under sloping field conditions. The distribution conduit is of minimal diameter to contain a minimum weight of liquid and to restrict the flow of liquid therethrough. The overall weight of the wiper bar and thereby the frame is minimized to minimize the weight of the implement as a whole.

5 Claims, 10 Drawing Figures

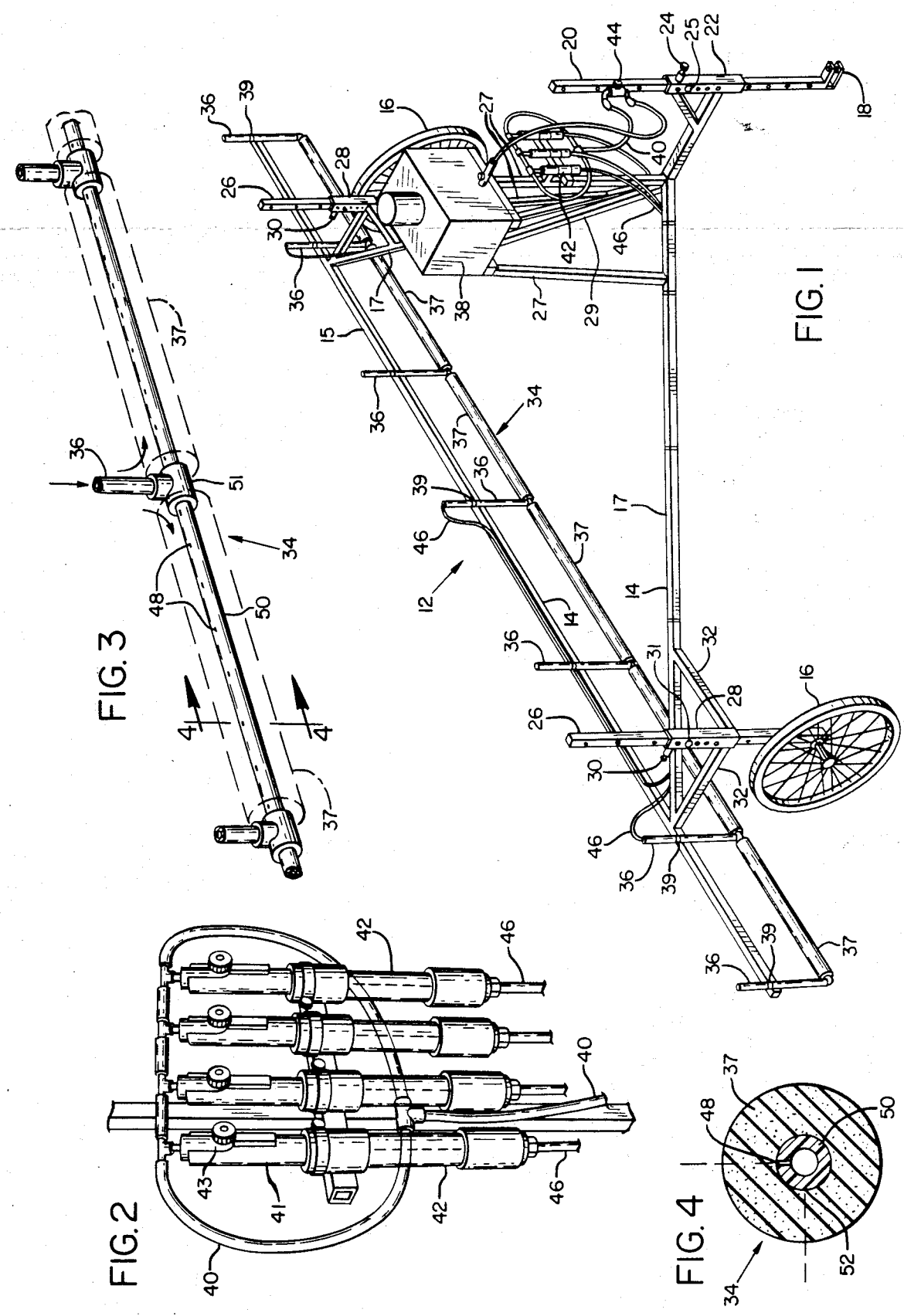

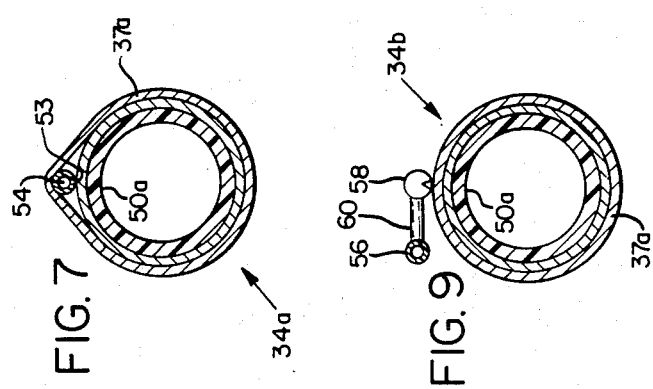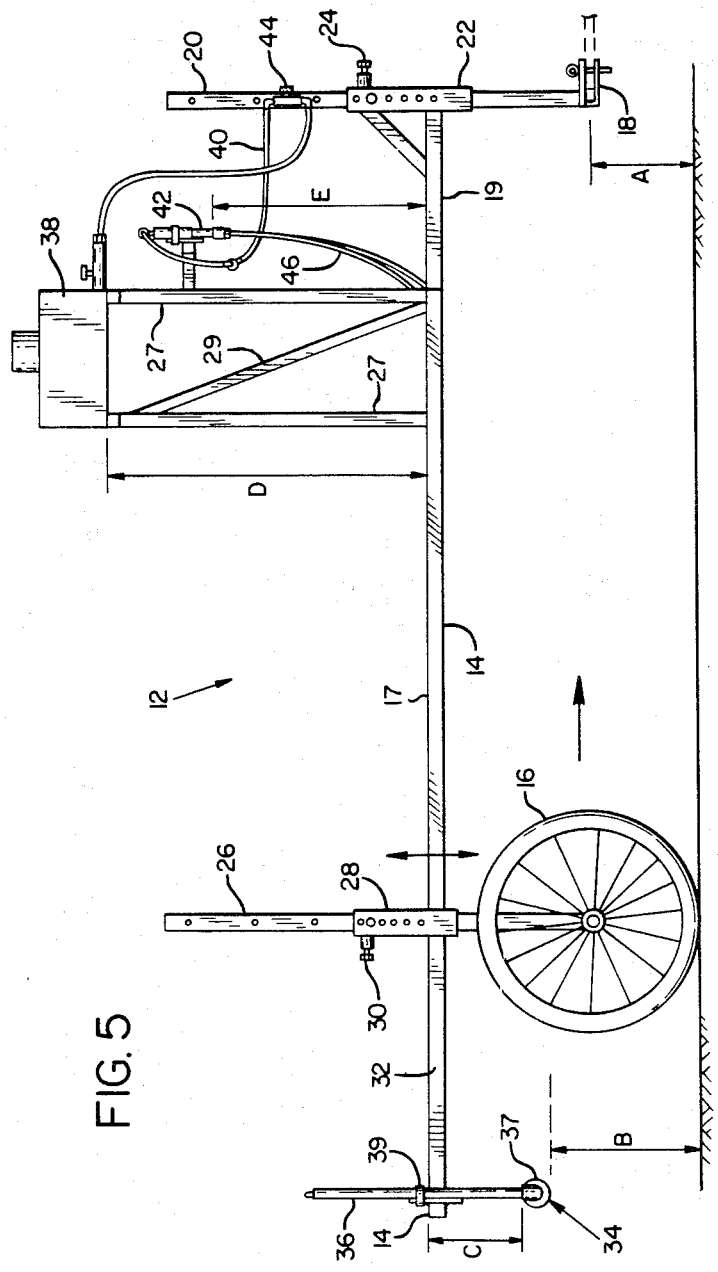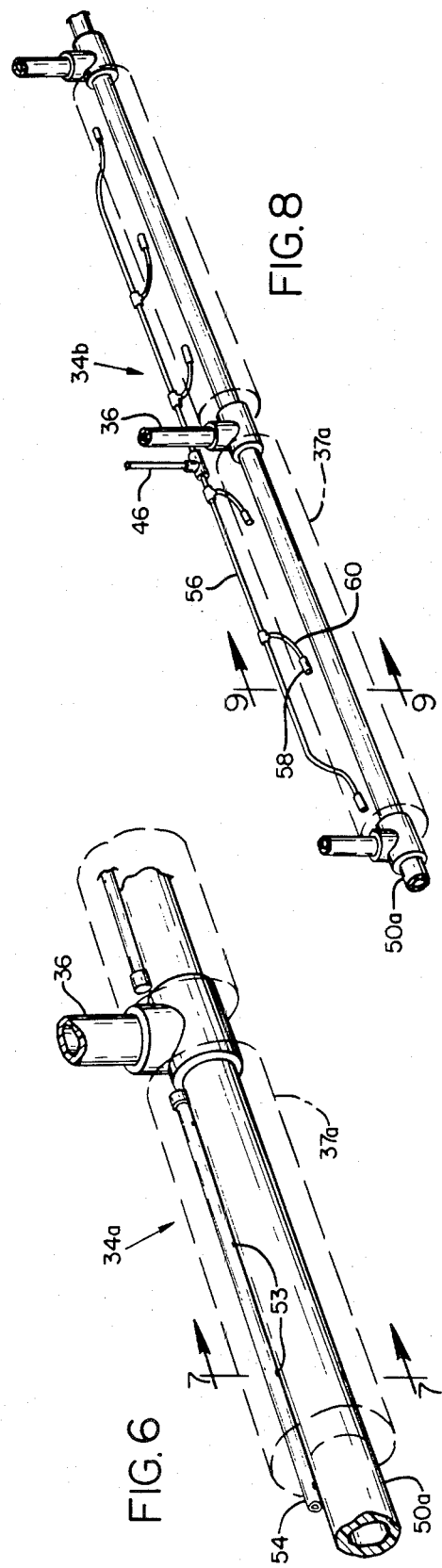

IMPLEMENT FOR CONTACT APPLICATION OF LIQUID HERBICIDES TO CROPS

BACKGROUND OF THE INVENTION

This invention relates to selective application of liquid herbicides to crops and more particularly to farm implements for contact application of herbicides.

Many systems have been devised for applying liquid herbicides to weeds growing among crops. Aside from aerial spraying, most of these systems employ a spray boom or contact applicator boom designed for mounting on the front or back of a conventional farming tractor. Some of them also use wheels to support the ends of the boom with the implement being drawn in a trailer fashion behind the tractor. The wheels used on all of these herbicide applicators are heavy standard farming implement wheels. As is customary with farming implements, all of these devices are relatively heavy and generally are sized so as to require a conventional farming tractor or similarly-sized vehicle to support or pull the implement.

Contact herbicide applicators have come to be preferred over spray applicators, because in many situations they are more economical in their use of herbicide. However, contact applicators have heretofore been complicated, expensive implements. Also, prior contact applicators have been unreliable in their operation, particularly in uneven terrain, resulting in spotty herbicide application and wastage of contact herbicide liquid, which is very expensive.

For example, U.S. Pat. No. 4,208,835 by Roll et al. describes a self-propelled herbicide applicator mounted on a special purpose vehicle, e.g., a converted swather, using standard large-size farm implement wheels. Herbicide is applied to the growing weeds via a front-mounted roller which receives herbicide from a resilient belting wiper under which the roller turns. The applicator bar is raised or lowered hydraulically through actuator controls located in the tractor cab. Such a device is expensive due to the elaborate controls and the use of a dedicated special purpose vehicle. It is also very heavy therefore requiring large wheels which trample the crops.

Similarly, U.S. Pat. No. 4,223,478 by McHugh describes a heavy, three-point hitch-drawn herbicide applicator requiring support from large standard farming implement wheels and a standard farming tractor to pull the device. Herbicide is applied to the crops in a similar manner to Roll, et al. through a roller which rotates under a dispensing conduit which supplies herbicide to the roller.

Besides trampling the crops, the roller type contact applicators tend to waste herbicide. In an attempt to overcome that drawback, elaborate failure-prone herbicide-dispensing control systems have been proposed, as in U.S. Pat. No. 4,265,048 to Schepers, et al.

Not all contact herbicide applicators utilize a roller. Another well-known type of applicator uses a fixed hollow pipe as a wiper bar. One such design is that of U.S. Pat. No. 4,019,278 to McKirdy, which uses two parallel medium-diameter pipes. The pipes are perforated along the bottom and include a wick-like material which is soaked by liquid herbicide supplied to the pipe from a tank. A valve is provided at the base of the tank to control the rate at which herbicide trickles into the pipe in an attempt to limit wastage of the herbicide.

A second such design uses a comparatively wide diameter, hollow pipe which serves as both the reservoir for the liquid herbicide and the dispensing conduit. An example of this type of contact applicator is available from Rear's Manufacturing Company of Eugene, Oreg. It uses a three or four inch diameter pipe. Herbicide liquid is discharged through a multitude of holes in the bottom of the pipe. Segments of nylon rope are plugged into the holes to act as wicks in drawing liquid to the pipe surface. As the pipe is swept over the crops, contact of the ropes with the growing weeds transfers the herbicide and kills the weeds.

The hollow-pipe type of applicator is disadvantageous because it is difficult to control the discharge of liquid, particularly in uneven terrain. As the implement of the McKirdy patent is pulled downhill in sloped terrain, an adequate flow of liquid herbicide will not be drawn to the surface of the applicator bar. In both the McKirdy and Rear's devices, when the applicator is pulled along a side of a hill, the herbicide liquid flows in the pipe to one lateral side of the implement. This depletes the supply of liquid in the uphill end of the pipe and pools it in the downhill end, causing uneven application and herbicide wastage. Also, both devices require a farm tractor to pull them, which causes trampling of crops.

Hand tools for lawn and garden contact herbicide application are known which utilize a system for drip feeding liquid to a wiper head at the lower end of the tool. For example, U.S. Pat. Nos. 4,305,224 and 4,357,779 to Maddock describe a hand-held liquid herbicide applicator which drip-feeds herbicide liquid from a reservoir in the tool handle to a wicking element, such as a sponge, partially enclosing the underside of a tubular dispensor conduit. A plurality of apertures are provided along the underside of the conduit for feeding liquid to the sponge. Herbicide flow to the sponge is maintained through a drip-feed control valve to assure an adequate yet not abundant flow to the sponge. Such a configuration would not prove useful in the above described applicator implement as the same problem of an inadequate herbicide distribution over sloped terrain would still be present. Similarly, Maddock does not suggest how to utilize his applicator head in a farm implement.

Therefore, a need exists for a new and improved farm implement for contact application of liquid herbicide, which will not trample crops and which provides effective control of liquid herbicide flow rates to a wiper bar regardless of the slope of the terrain over which the implement is used.

SUMMARY OF THE INVENTION

One object of the invention is to provide a new and improved farming implement for contact application of a liquid herbicide to undesired vegetation.

A second object of the present invention is to provide a contact herbicide applicator implement which can be pulled by a lightweight two- or three-wheeled vehicle over nearly mature crops without significantly trampling them.

Another object of the invention is to provide an improved herbicide feed system for contact applicator implements which enables the applicator to function properly regardless of the level of the liquid herbicide remaining in the reservoir or of the slope of the terrain over which the implement is drawn.

A further object of the invention as aforesaid is to assure uniform liquid dispersion both laterally and longitudinally along the wiper bar.

In accordance with the present invention, an ultra-lightweight farm implement for contact application of liquid herbicides is provided. The implement comprises an elongated applicator or wiper bar supported on an ultra-lightweight frame which, in a preferred embodiment, is carried on very tall narrow wheels. A tank mounted above the implement hitch gravity feeds herbicidal liquid through a narrow distribution conduit to the wiper bar. The entire structure is made as light as possible so that it can be pulled by a lightweight two- or three-wheeled vehicle, such as a motorcycle, over nearly mature crops with little or no damage. This is made possible by making the wiper bar itself as light as possible, particularly by minimizing the volume of herbicide supported in the wiper bar. An ultra-lightweight supporting framework can thus be made of lightweight steel tubing and supported on narrow wire-spoked wheels.

The wiper bar comprises an elongated structural support member surrounded by herbicide absorbent or wicking material such as synthetic chamois cloth or the sponge material used in the applicator of Maddock '779. The herbicide absorbent material completely surrounds the support member and the herbicide distribution conduit includes liquid outlets spaced along an upper portion of the wiper bar. The structural support member is preferably a stiff plastic pipe.

Liquid herbicide is gravity-fed to each wiper bar section from the elevated tank through feed lines connected to a drip valve. The feed lines are very narrow in diameter both to minimize weight and, by resisting liquid flow, to control the rate of flow of herbicides released to the wicking material. The distribution conduit outlets are located along the top of the wiper bar to assure optimum dispersion of the liquid throughout the wick material. The outlets are relatively few in number and sized sufficiently small to assure that the distribution conduits are filled with liquid, thus creating back pressure in the distribution conduit. This arrangement backs liquid herbicide into the feed lines so that the liquid is supplied to the wiper bar under a substantially constant pressure regardless of the slope of the terrain over which the implement is drawn. At the same time, the narrow diameter of the conduits minimizes their weight and provides resistance to liquid flow.

The wiper bar is preferably divided lengthwise into separate five-foot sections so that the total length of an applicator can be from a minimum of five feet up to thirty or more feet in five-foot increments. The wiper bar is suspended from the frame, for example, by a series of vertical rods spaced at two and one-half foot intervals. These rods can be independently moved up and down through adjustable clamps on the ultra-lightweight frame to level and straighten the wiper bar. The tall narrow wheels are similarly mounted on vertical members slidably connected to the frame via sleeves. A removable pin allows the sleeves to be moved up and down on the vertical members to vary the elevation of the frame and thereby the elevation of the wiper bar relative to the ground. Such a configuration permits easy height adjustment of the wiper bar. The ultra-lightweight frame and wiper bar can be hinged at adjacent ends of the wiper bar sections at two points spaced apart and centered about the hitch so a wide applicator can be transported down a road with the outer sections trailing behind.

The foregoing and other objects, features, and advantages of the present invention will be more fully understood from the following description when read in conjunction with the accompanying drawings.

BRIEF DESCRIPTION OF THE DRAWINGS

FIG. 1 is a perspective view of one embodiment of a pull-type contact applicator implement in accordance with the present invention.

FIG. 2 is an enlarged view of the drip valve assembly of the implement of FIG. 1.

FIG. 3 is an enlarged fragmentary view of a portion of the wiper bar of the implement of FIG. 1 with the surrounding-herbicide-absorbent material shown in phantom lines.

FIG. 4 is an enlarged cross-sectional view taken along line 4—4 in FIG. 3.

FIG. 5 is a side elevational view of the applicator of FIG. 1.

FIG. 6 is a fragmentary perspective view of a section of a second embodiment of the wiper bar.

FIG. 7 is a cross-sectional view taken along line 7—7 of FIG. 6.

FIG. 8 is a fragmentary perspective view of a third embodiment of the wiper bar.

FIG. 9 is a cross-sectional view taken along line 9—9 in FIG. 8.

DETAILED DESCRIPTION OF THE INVENTION

Figure 10:
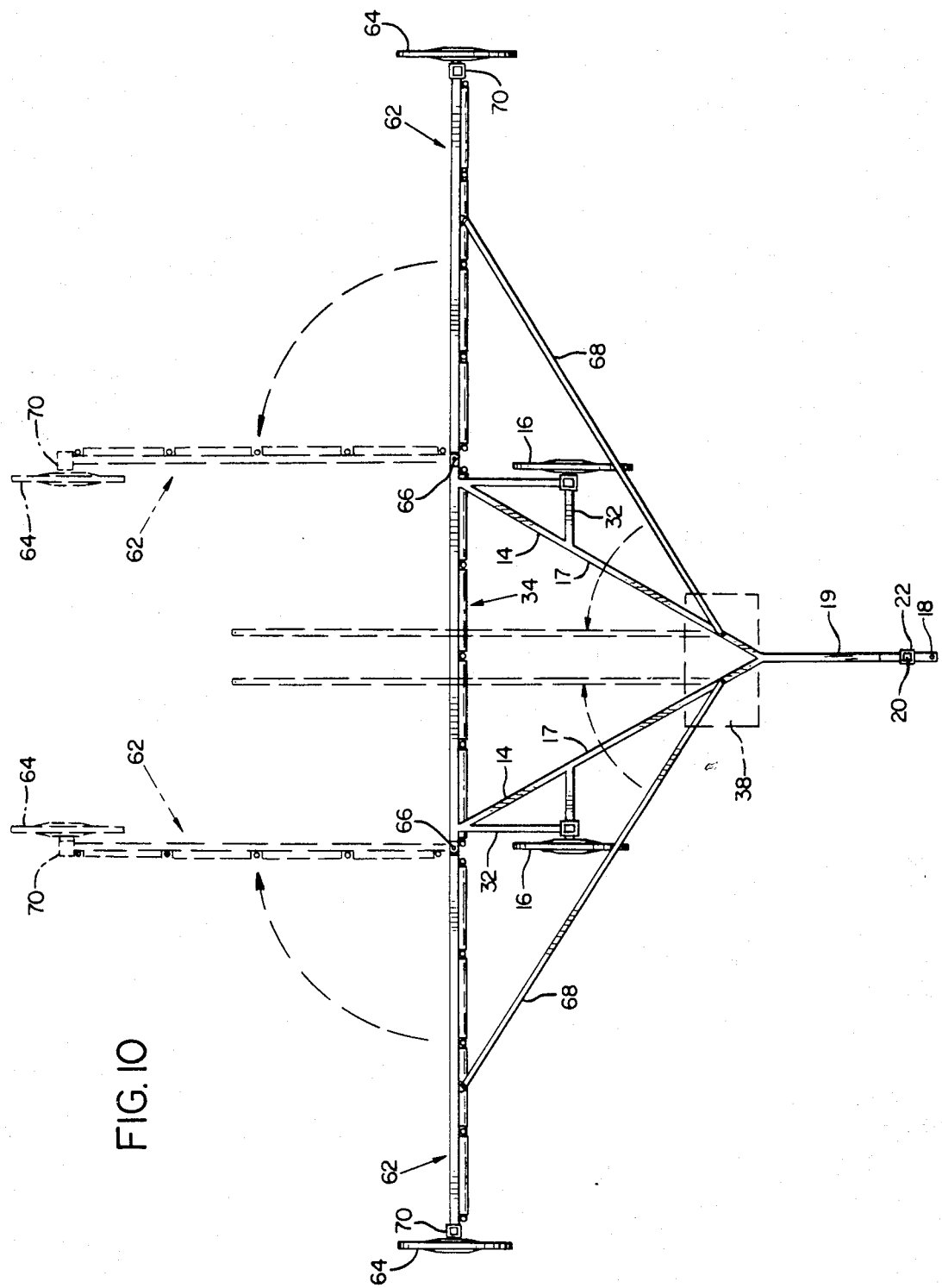
FIG. 10 is a top plan view of a second embodiment of a contact herbicide applicator in accordance with the invention.

Referring to FIG. 1, an implement for contact application of liquid herbicides is indicated in its entirety by the reference numeral 12.

The implement includes an ultra-lightweight, horizontally extending frame 14 supported by tall, laterally spaced narrow wheels 16. The implement includes a hitch 18 at the front end of the frame for connection to a lightweight three-wheeled motorcycle. Frame 14 comprises a transverse horizontal beam 15 centered behind the hitch. Beam 15 is connected to the hitch by a pair of horizontal connecting beams 17 through a short hitch stand-off member 19. Beams 15, 17 are interconnected to form an approximately equilateral triangle. The hitch comprises a vertical member 20 which can be slidably adjusted vertically within a sleeve 22 with pin 25 to align hitch 18 with the motorcycle drawbar from different frame elevations. This will enable the lightweight frame 14 to remain parallel to the ground. As an alternative to hitch 18, a single steerable wheel can be provided on the lower end of vertical member 20 and a drawbar connected to the wheel thereby enabling a two-wheeled motorcycle easily to pull the implement. Tall narrow wheels 16 are connected to vertical members 26 which are slidably received in sleeves 28. Vertical members 26 can be raised or lowered in sleeves 28 with set pins 31, thereby adjusting the height of lightweight frame 14 above the ground. Sleeves 28 are connected to the lightweight frame 14 via horizontally extending frame members 32 connected in a triangular pattern to the outer lateral sides of beams 17. Lockbolts 24, 30 in sleeves 22, 28 are tightened for transporting the implement. Wheels 16 are wire spoked, 26-inch diameter ball bearing hubbed cart wheels with 2.25-inch wide, balloon-type tires.

In one example of the lightweight frame 14, beams 15, 17, and 19, vertical members 26 and 20, the tank stand members 27 and 29, and connecting members 32 are constructed of hollow 1½-inch square steel tubing with a wall thickness of 0.095 inch. Such tube material weighs 1.82 lbs./ft. Sleeves 28 and 22 are constructed of hollow 1¾-inch diameter tubing and are 9 inches long. The sleeve tubing weights 2.14 lbs./ft.

An elongated wiper bar 34 extends laterally of and is suspended from beam 15 of the ultra-lightweight frame 14 through vertically adjustable tubular support members 36. Support members 36 are releasably connected to the lightweight frame 14 via clamps 39 so that they raised and lowered to level the wiper bar under beam 15. The elongated wiper bar 34 comprises a stiff cylindrical plastic (PVC) pipe 50 completely surrounded by an annular layer of herbicide-absorbent material 37.

Tank 38 is mounted on the lightweight frame 14 rearwardly adjacent and above hitch 18 and a tank stand comprising three triangularly arranged upright members 27 and one diagonal brace member 29. A primary feed line 40 is connected to the tank to supply herbicide liquid to drip valves 41 through an operator control valve 44 mounted on hitch upright member 20. Secondary feed lines 46 supply liquid herbicide from the valves to wiper bar 34 through distribution conduits, described hereinafter. Referring to FIG. 2, drip valves 41 individually meter liquid from feed line 40 through a sight tube 42 into lines 46 under control of vertically adjustable valve controls 43.

Referring now to FIGS. 3 and 4, liquid herbicide is supplied to wiper bar 34 through tubular support members 36. In this embodiment, wiper bar support member 50 itself serves as the final or terminating part of the liquid distribution conduit means. Every other tubular support member is connected to one of feed lines 46 and the remaining support members are plugged. The support members are connected to the wiper bar support member 50, and communicate therewith, through T-connectors 51. The liquid is discharged in the absorbent material 37 through holes 48 located at spaced intervals along the uppermost portion of wiper bar structural support member 50. To adequately soak material 37, holes 48 should be placed at or above midline position 52 as shown in FIG. 4. Holes 48 are very small, on the order of 60 to 65 wire gauge in diameter, and are formed in the plastic pipe by forcing a hot wire through the walls of the support member 50 at approximately 6-inch intervals. With this arrangement, liquid herbicide will flow under low pressure (less than about 2 psi) through holes 48 and evenly permeate the herbicide absorbent material 37.

FIG. 5 best shows the relative heights of the various components. As mentioned above, vertical members 26 and 20 can be slidably adjusted in sleeves 28 and 22 with positioning pins 31 and 25, respectively, removed to set the elevation of frame 14 above the ground as the implement is drawn over crops. Distance A indicates the height above the ground at which the hitch connector on the vehicle is located. Distance B is the height of the bottom of the wiper bar 34 above the ground and is adjusted in, for example, one-inch increments to be just slightly higher than the height of the uppermost growing crops, at an elevation to contact any weeds extending above the crop. Distance C is the distance from the top of frame 14 to the top of the wiper bar 34 and can be changed by adjusting the position of vertical support members 36 via clamps 39. Distance C is normally about 9 inches to 1 foot. Distance B can be varied by moving either or both of vertical members 22, 26, and 36. Distance D is the height of the bottom of tank 38 above the top of frame 14 and in one example of the invention equals 3 feet. Distance E is the height of the bottom of sight tubes 42 below drip valves 41 above lightweight frame 14 and is at least 1 foot. This vertical spacing provides a liquid head in the feed lines of approximately 2 feet (distance E plus distance C) above the wiper bar as the implement is drawn over level terrain. As the implement is drawn up and down sloped terrain, fluid pressure is maintained within an operating range that neither depletes nor oversupplies liquid to the wiper bar. As the implement is drawn across sloped terrain, pressure is maintained in the uphill portion of the wiper bar by the head created in the feed line 46. As the slope increases, liquid completely fills the uphill sight glasses and backs up into the tank 38 which increases the effective head to at least 2 feet above the drip valves serving the uphill sections of the wiper bar. This arrangement assures a constant flow of liquid herbicide to all portions of the wiper bar as the implement is drawn over sloped terrain.

FIGS. 6 and 7 refer to a second embodiment of the wiper bar. Wiper bar structural support member 50a is a stiff plastic pipe wider in diameter than pipe 50 and surrounded by one or two layers of a relatively thinner herbicide absorbent material than sponge 37, a synthetic chamois material 37a. The best form of synthetic chamois for this use is a commercially available nonwoven felt-like fibrous fabric without any rubber backing so as to maximize liquid permeability. Liquid herbicide is fed to wiper bar 34a through the conduit means which terminates in drip soaker tube 54. Tube 54 extends lengthwise along the upper side of the wiper bar support member 50a and is positioned under the outer layer of the synthetic chamois material 37a. The preferred form of drip soaker tube is a ¼-inch outside diameter, 3/16-inch inside diameter drip type irrigation pipe such as Carefree Drip and Mist Soaker Tube #15 available from Carefree Irrigation Supplies Inc., 33155 Camino Capistrano, San Juan Capistrano, Calif. 92675. Such a soaker tube possesses four evenly spaced pin holes of 60–65 gauge diameter per 2½ feet of length. Liquid herbicide supplied under pressure to soaker tube 54 weeps out and permeates the synthetic chamois material 37a.

FIGS. 8 and 9 show yet a third embodiment of the wiper bar 34b. In this embodiment liquid herbicide is supplied to the synthetic chamois material 37a via conduit means 46 connected to a distribution line 56 which feeds a plurality of terminal drip emitter valves 58 via connecting lines 60. A suitable form of such feed arrangement is Carefree's #9 irrigation emitter system. To secure lines 56, 60 and emitters 58 in place, nylon mesh netting material (not snown) is wrapped around wiper bar 34b. Using this distribution system in combination with the gravity feed system of the present invention (about 2 feet of head) will provide a flow rate to the wiper bar of approximately one-third gallon per hour per drip emitter valve. Three emitters are used per 2½ foot length of wiper bar.

FIG. 10 shows another embodiment of the herbicide applicator which is constructed generally in accordance with the applicator shown in FIG. 1. In this embodiment, wiper bar 34 is extended well beyond tail wheels 16 via wing members 62. Wings 62 are hinged in the frame at their inner ends at points 66 and supported at their outer ends by tall narrow wheels 64 of the same dimension as wheels 16. The wings held in an extended position via bracing members 68 which are connected to beams 17 near the front end frame 14. Bracing members 68 are preferably constructed of 1-inch square steel tubing with a wall thickness of 0.049 inch. Such steel tubing weighs 0.63 lb./ft. Wing members 62 can be hinged back to a trailing position about hinge points 66 in order that the implement may be drawn down a road. In the trailing configuration, bracing members 68 and wing members 62 are positioned as shown in dashed lines. Wheels 64 are repositioned by 90° for proper trailing by removing the upright members on which they are mounted from end sleeves 70 and then rotating and reinserting the upright members in the sleeves. In one example, the implement of FIG. 10 has a wiper bar span of 30 feet, yet has a dry weight of only approximately 165 pounds and a weight of approximately 245 pounds when full of herbicide, and can be easily pulled by a motorcycle.

Operation

To use implement 12, the implement is hitched to a pulling vehicle, such as a two- or three-wheeled motorcycle. If a two-wheeled motorcycle is used, hitch 18, 20 is replaced by a steerable wheel assembly. Next, with valve 44 closed, tank 38 is filled with a contact herbicide liquid, such as ROUNDUP.

Next, valve 44 is turned on to admit herbicide liquid to the valves 41, which are then adjusted, observing the flow rate through the sight tubes 42 to obtain the proper rate of flow of herbicide liquid to the wiper bar. Further adjustments are likely to be made subsequently, during operation of the implement, to match the liquid flow rate required by the amount of weeds being contacted by the wiper bar. The frame as a whole is moved up or down on upright members 20, 26 to set the elevation of the wiper bar to pass above the level of the crops to be treated, but low enough to contact any weeds growing above the crops. The implement is now ready to operate to apply herbicide to a field. As the implement is drawn through a field, it passes over the crops, and the tall narrow wheels pass between the plants in the field without trampling the crop. Herbicide liquid in the absorbent material 37 is brushed onto the weeds and is continually replenished by liquid from the tank. The flow rate is restricted and thereby causes a head of liquid to develop in the liquid feed lines to an elevation of about 1 foot above the frame, when the implement is being drawn over level grounds. Upon completion of a field, valve 44 is turned off to stop the flow of liquid herbicide from the tank to the wiper bar.

Having illustrated and described the principles of my invention in a preferred embodiment and several alternate embodiments and variations thereof, it should be apparent to those skilled in the art that the invention can be modified in arrangement and detail without departing from such principles. For example, the invention can readily be modified for mounting on the front or a three-point hitch of a tractor.

I claim all modifications coming within the spirit and scope of the following claims:

1. A farm implement for contact application of a liquid to growing plants, comprising:
    frame means adapted to be moved across a field of growing plants on which a liquid is to be applied;
    an elongated wiper bar supported by the frame means and extending transversely to the direction of movement thereof, the wiper bar comprising a plurality of longitudinally-extending sections, each of the sections comprising a rigid support member and liquid-absorbent material surrounding the support member;
    a tank for the liquid mounted on the frame means above the wiper bar at a first elevation above the wiper bar;
    a feed line extending downwardly from the tank for gravity feeding liquid to the wiper bar;
    a plurality of drip valves connected in parallel to the feed line below the tank, each of the drip valves being at a second elevation which is less than the first elevation above the wiper bar, each of the drip valves being associated with a respective section of the wiper bar; and
    a plurality of closed distribution conduit means, one of the plurality of conduit means connecting each of the drip valves with the interior of its respective section of the wiper bar for individually supplying liquid to each said section and to the material surrounding the support member thereof, each of the conduits means including sighting means for viewing the level of liquid in the conduit means;
    the drip valves being adjustable and the distribution conduit means being sized to establish an independent visible head of liquid in each of the conduit means during flow of liquid from the tank, thereby to obtain a constant flow of liquid to each of the sections of the wiper bar regardless of the relative elevation of the sections with respect to each other.

2. A farm implement as in claim 1 in which the support member of each section of the wiper bar is hollow and comprises a plurality of outlet holes spaced therealong, each one of the conduit means communicating with the interior of its respective support member.

3. A farm implement as in claim 2 in which the outlet holes are located along an upper side of the support member.

4. A farm implement as in claim 1 in which each of the conduit means includes a narrow diameter pipe having a plurality of small outlet holes spaced therealong, each of the pipes extending along the respective support member of the wiper bar for discharging the gravity-fed liquid approximately uniformly into the liquid-absorbent material.

5. A method of distributing liquid from a tank to the interior of an elongated liquid-applying agricultural wiper bar, the bar comprising a plurality of longitudinally-extending sections, each of the sections comprising a hollow rigid support member and liquid-absorbent material surrounding the support member, the tank being at a first elevation above the wiper bar, the method comprising:
    dividing a primary flow of liquid from the tank into a plurality of secondary flows corresponding to the number of sections of the wiper bar; and
    individually metering the secondary flows to each of the sections of the wiper bar through conduit means including liquid sighting means from a second elevation which is less than the first elevation above the wiper bar, said metering of said secondary flows being at a rate sufficiently restricted to cause a visible independent head of liquid to develop in the sighting means above each of the sections, thereby to obtain a constant flow of liquid to each of the sections of the wiper bar regardless of the relative elevation of the sections with respect to each other.

* * * * *

UNITED STATES PATENT AND TRADEMARK OFFICE
CERTIFICATE OF CORRECTION

PATENT NO. : 4,550,526
DATED : November 5, 1985
INVENTOR(S) : Willard Smucker

It is certified that error appears in the above-identified patent and that said Letters Patent is hereby corrected as shown below:

[57] ABSTRACT, line 3, after "on" delete --a--;

Column 4, line 17, after "surrounding" delete the hyphen (-); and

Column 8, line 22, claim 1, after "including" insert --liquid--.

Signed and Sealed this

Twenty-fifth Day of February 1986

[SEAL]

Attest:

DONALD J. QUIGG

Attesting Officer

Commissioner of Patents and Trademarks